US010814690B1

(12) United States Patent
Katzourakis et al.

(10) Patent No.: US 10,814,690 B1
(45) Date of Patent: Oct. 27, 2020

(54) ACTIVE SUSPENSION SYSTEM WITH ENERGY STORAGE DEVICE

(71) Applicants: Diomidis Katzourakis, Chania (GR); Christopher L. Porritt, Sunnyvale, CA (US); Johannes A. Huennekens, San Jose, CA (US); Huibert Mees, Pleasanton, CA (US); Paul J. Keas, Sunnyvale, CA (US)

(72) Inventors: Diomidis Katzourakis, Chania (GR); Christopher L. Porritt, Sunnyvale, CA (US); Johannes A. Huennekens, San Jose, CA (US); Huibert Mees, Pleasanton, CA (US); Paul J. Keas, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 290 days.

(21) Appl. No.: 15/935,293

(22) Filed: Mar. 26, 2018

Related U.S. Application Data

(60) Provisional application No. 62/486,584, filed on Apr. 18, 2017.

(51) Int. Cl.
*B60G 17/0165* (2006.01)
*B60G 17/015* (2006.01)

(52) U.S. Cl.
CPC ..... *B60G 17/0165* (2013.01); *B60G 17/0155* (2013.01); *B60G 2202/412* (2013.01);
(Continued)

(58) Field of Classification Search
CPC ............ B60G 17/0165; B60G 17/0155; B60G 2202/412; B60G 2202/413;
(Continued)

(56) References Cited

U.S. PATENT DOCUMENTS 3,781,032 A   12/1973   Jones
4,530,514 A    7/1985   Ito
(Continued)

FOREIGN PATENT DOCUMENTS

CN   108215946 A    6/2018
CN   208439009 U    1/2019
(Continued)

OTHER PUBLICATIONS

Monroe Intelligent Suspension, "CVSA2/Kinetic: Low Energy for High Performance", www.monroeintelligentsuspension.com/products/cvsa2-kinetic/, Date Unknown, Downloaded Mar. 2, 2017, 2 pp.
(Continued)

*Primary Examiner* — Yazan A Soofi
(74) *Attorney, Agent, or Firm* — Young Basile Hanlon & MacFarlane, P.C.

(57) ABSTRACT

An active suspension system for a vehicle having a wheel that is subject to an external force includes an actuator having an output structure that is connected to the wheel, an energy storage device having a compressible chamber, a valve assembly that is operable to control flow of a working fluid between the actuator and the energy storage device, and a controller that determines whether to permit or resist motion of the output structure in response to the external force. The controller permits motion of the output structure by allowing fluid to flow from the actuator to the energy storage device using the valve assembly, thereby compressing the compressible chamber. The controller resists motion of the output structure by allowing fluid to flow from the energy storage device to the actuator using the valve assembly, thereby expanding the compressible chamber.

20 Claims, 6 Drawing Sheets

(52) U.S. Cl.
CPC .. *B60G 2202/413* (2013.01); *B60G 2202/414* (2013.01); *B60G 2202/416* (2013.01); *B60G 2202/44* (2013.01); *B60G 2204/62* (2013.01); *B60G 2400/64* (2013.01); *B60G 2500/30* (2013.01); *B60G 2600/182* (2013.01)

(58) Field of Classification Search
CPC .......... B60G 2202/414; B60G 2202/44; B60G 2204/62; B60G 2400/64; B60G 2500/30; B60G 2600/182
USPC .......................................................... 701/37
See application file for complete search history.

(56) References Cited

U.S. PATENT DOCUMENTS

| | | |
|---|---|---|
| 4,537,420 A | 8/1985 | Ito et al. |
| 4,589,678 A | 5/1986 | Lund |
| 4,613,152 A | 9/1986 | Booher |
| 4,634,142 A | 1/1987 | Woods et al. |
| 4,637,628 A | 1/1987 | Perkins |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,033,028 A | 7/1991 | Browning |
| 5,060,959 A | 10/1991 | Davis et al. |
| 5,244,053 A | 9/1993 | Kashiwagi |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,678,847 A | 10/1997 | Izawa et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,170,838 B1 | 1/2001 | Laurent et al. |
| 6,249,728 B1 | 6/2001 | Streiter |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,634,445 B2 | 10/2003 | Dix et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,548,678 B2 | 10/2013 | Ummethala et al. |
| 8,579,311 B2 | 11/2013 | Butlin, Jr. et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,513,161 B2 | 12/2019 | Anderson et al. |
| 2003/0030241 A1 | 2/2003 | Lawson |
| 2004/0074720 A1 | 4/2004 | Thieltges |
| 2004/0226788 A1* | 11/2004 | Tanner ................... B60G 13/14 188/267.1 |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0199750 A1 | 8/2007 | Suzuki et al. |

(56) References Cited

U.S. PATENT DOCUMENTS

| | | |
|---|---|---|
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0222960 A1 | 9/2010 | Oida et al. |
| 2010/0252376 A1 | 10/2010 | Chern et al. |
| 2011/0115183 A1 | 5/2011 | Alesso et al. |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0187640 A1 | 7/2012 | Kondo et al. |
| 2012/0305348 A1* | 12/2012 | Katayama ............ B60G 17/08 188/266.2 |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0341143 A1 | 12/2013 | Brown |
| 2014/0260233 A1* | 9/2014 | Giovanardi ......... F15B 13/0444 60/431 |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1* | 8/2015 | Anderson ............ B60G 17/019 701/37 |
| 2015/0231942 A1 | 8/2015 | Trangbaek et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0291574 A1 | 10/2016 | Parison |
| 2016/0339823 A1 | 11/2016 | Smith et al. |
| 2017/0047823 A1 | 2/2017 | Sangermano, III et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1* | 5/2017 | Anderson ............ B60W 10/22 |
| 2017/0203673 A1 | 7/2017 | Parker et al. |
| 2017/0253101 A1 | 9/2017 | Kuriki |
| 2017/0253155 A1 | 9/2017 | Knox et al. |
| 2018/0089901 A1 | 3/2018 | Rober et al. |
| 2018/0105082 A1 | 4/2018 | Knox |
| 2018/0162186 A1 | 6/2018 | Anderson et al. |
| 2018/0162187 A1 | 6/2018 | Trangbaek |
| 2018/0297587 A1 | 10/2018 | Kasaiezadeh Mahabadi et al. |
| 2018/0345747 A1 | 12/2018 | Boon et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |

FOREIGN PATENT DOCUMENTS

| | | |
|---|---|---|
| DE | 102009060213 A1 | 6/2011 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 2072855 A1 | 6/2009 |
| EP | 2233330 B1 | 2/2013 |
| EP | 3088230 A1 | 11/2016 |
| GB | 2437633 A | 10/2007 |
| JP | 2006200734 A | 8/2006 |
| JP | 5796315 B2 | 10/2015 |
| KR | 101509600 B1 | 4/2015 |
| WO | 9304883 A1 | 3/1993 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

Wikipedia, "Trailing-arm suspension", https://en.wikipedia.org/wiki/Trailing-arm_suspension, downloaded Sep. 3, 2019 (2 pp).

Daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

Youtube.com, KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

Autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

Press.porsche.com, "Introducing the Porsche 918 Spyder", Date Unknown, http://press.porsche.com/news/release.php?id=787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

\* cited by examiner

FIG. 8

ACTIVE SUSPENSION SYSTEM WITH ENERGY STORAGE DEVICE

CROSS-REFERENCE TO RELATED APPLICATIONS

This application claims the benefit of U.S. Provisional Application No. 62/486,584, entitled "Active Suspension System with Energy Storage Device," filed on Apr. 18, 2017, the content of which is incorporated herein by reference in its entirety.

TECHNICAL FIELD

The application relates generally to active suspension systems.

BACKGROUND

Active suspension systems incorporate actuators that are controlled by an external controller to change the ride characteristics of a vehicle in response to sensed conditions. Functions performed by active suspension systems can include, for example, controlling the vertical movement of the wheels of the vehicle relative to a vehicle body of the vehicle, controlling damping firmness at each of the wheels, and self-levelling.

SUMMARY

One aspect of the disclosed embodiments is an active suspension system for a vehicle having a wheel that is subject to an external force. The active suspension system includes an actuator having an output structure that is connected to the wheel, an energy storage device having a compressible chamber, a valve assembly that is operable to control flow of a working fluid between the actuator and the energy storage device, and a controller that determines whether to permit or resist motion of the output structure in response to the external force. The controller permits motion of the output structure by allowing fluid to flow from the actuator to the energy storage device using the valve assembly, thereby compressing the compressible chamber. The controller resists motion of the output structure by allowing fluid to flow from the energy storage device to the actuator using the valve assembly, thereby expanding the compressible chamber.

Another aspect of the disclosed embodiments is a system that includes a hydraulic actuator having a body, a piston rod that extends out of the body, a piston head disposed in the body, an upper volume defined inside the body on a first side of the piston head, and a lower volume defined inside the body on a second side of the piston head. The system also includes an energy storage device having a housing, an upper chamber defined inside the housing, a lower chamber defined inside the housing, and a compressible chamber defined inside the housing. The system also includes an upper valve assembly that is operable to control flow of a working fluid between the upper volume of the hydraulic actuator and the upper chamber of the energy storage device. The system also includes a lower valve assembly that is operable to control flow of the working fluid between the lower volume of the hydraulic actuator and the lower chamber of the energy storage device. The system also includes a controller that controls of operation at least one of the upper valve assembly or the lower valve assembly to store energy in the energy storage device by compressing the compressible chamber by flow of the working fluid into the energy storage device from the hydraulic actuator when a desired travel direction for the piston rod matches an external force direction. The controller controls operation of at least one of the upper valve assembly or the lower valve assembly to release energy from the energy storage device by expanding the compressible chamber by flow of the working fluid into the hydraulic actuator from the energy storage device when the desired travel direction for the piston rod is opposite the external force direction.

Another aspect of the disclosed embodiments is a method that includes determining a desired direction of travel for an actuator, determining an external force direction of an external force that is applied to the actuator, and determining whether the external force direction matches the desired direction of travel for the actuator. In response to determining that the external force direction matches the desired direction of travel for the actuator, the method includes controlling a valve assembly to cause storage of energy from the actuator in an energy storage device by compressing a compressible chamber of the energy storage device by flow of a working fluid into the energy storage device from the actuator. In response to determining that the external force direction does not match the desired direction of travel for the actuator, the method includes controlling the valve assembly to cause release of energy from the energy storage device to the actuator by expanding a compressible chamber of the energy storage device by flow of the working fluid from the energy storage device to the actuator.

DETAILED DESCRIPTION

The disclosure herein relates to an active suspension that includes a hydraulic actuator and an energy storage device. The energy storage device includes a compressible medium or an elastic structure that is compressed by fluid flow resulting from external forces that are applied to the hydraulic actuator. Valves control fluid flow to and from the energy storage device so that stored energy can be retained and later released when needed to supply fluid pressure to the hydraulic actuator.

Figure 1:
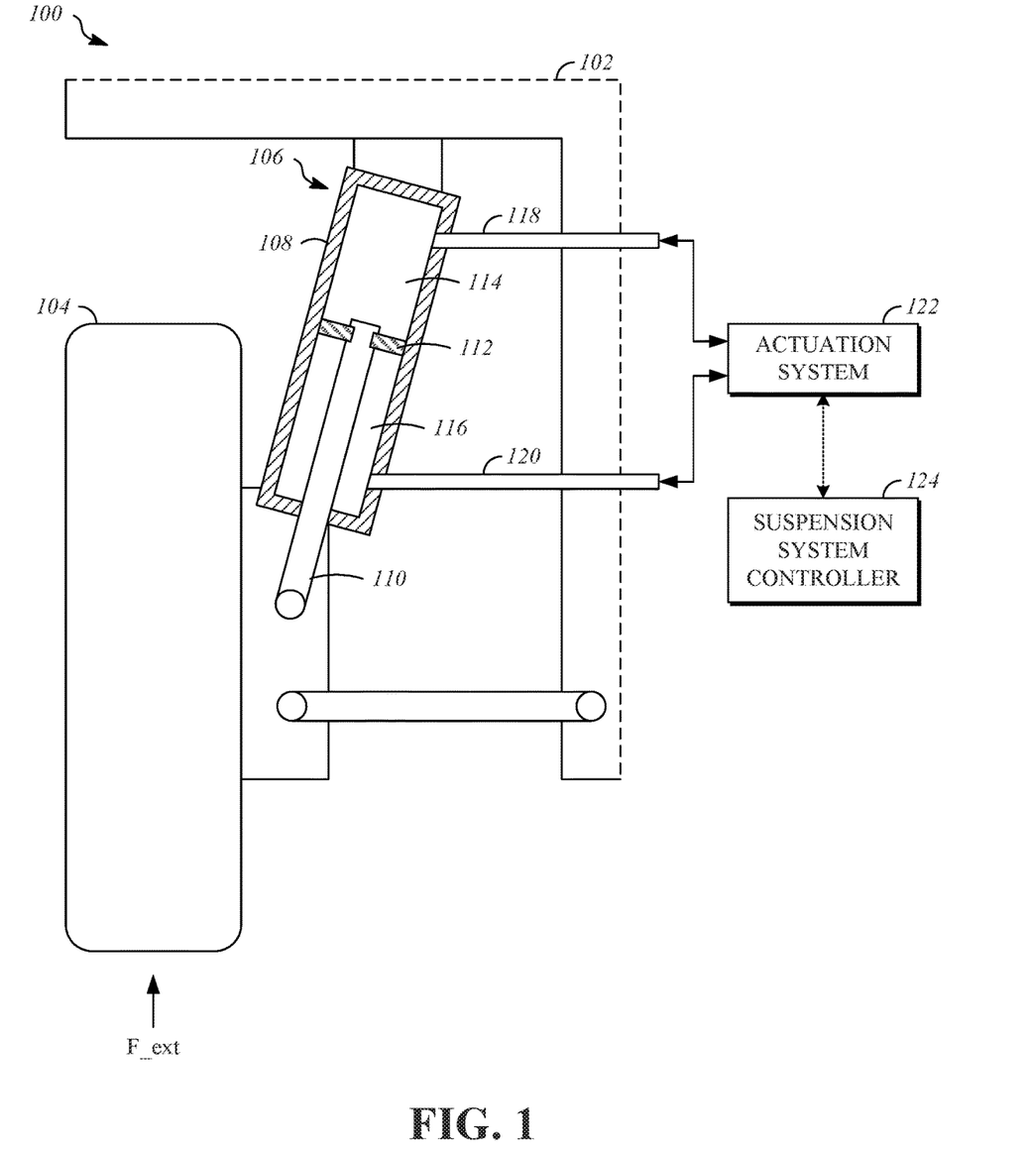
FIG. 1 is an illustration that shows a portion of a vehicle that has a hydraulic actuator, an actuation system, and a suspension system controller.

FIG. 1 shows a portion of a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes a road wheel 104. The road wheel 104 is one of multiple (e.g., four) wheels that can be included as part of the vehicle 100 to contact the surface on which the vehicle 100 is travelling. The characteristics of the road wheel 104 are responsible, in part, for the amount of friction available, and the road wheel 104 therefore includes a friction enhancing structure such as a conventional pneumatic tire that is formed in part from synthetic rubber.

The road wheel 104 is mechanically connected to the vehicle body 102 in a manner that allows motion of the road wheel 104 relative to the vehicle body 102. This connection includes a hydraulic actuator 106 that is operable to dampen motion of the road wheel 104 relative to the vehicle body 102. The hydraulic actuator 106 is an actively controlled component having one or more adjustable characteristics, as will be described herein. During operation of the vehicle 100, the road wheel 104 is subjected to external forces F_ext, and the hydraulic actuator 106 can be controlled to react to the external forces F_ext in a desired manner.

The hydraulic actuator 106 includes a cylinder body 108, a moveable output structure such as a piston rod 110 that extends out of the cylinder body 108, and a piston head 112 that is located inside the cylinder body 108. An internal space of the cylinder body 108 is divided by the piston head 112 into an upper volume 114 and a lower volume 116. The upper volume 114 is located inside the cylinder body 108 on a first side of the piston head 112. The lower volume 116 is located inside the cylinder body 108 on a second side of the piston head 112. An upper hydraulic feed line 118 is connected to the cylinder body 108 to supply fluid to and receive fluid from the upper volume 114. A lower hydraulic feed line 120 is connected to the cylinder body 108 to supply fluid to and receive fluid from the lower volume 116.

The upper hydraulic feed line 118 and the lower hydraulic feed line 120 of the hydraulic actuator 106 are connected to an actuation system 122. The actuation system 122 is operable to regulate transmission of fluid to and from the hydraulic actuator 106 in order to control the operating characteristics of the hydraulic actuator 106. As will be explained herein, the actuation system 122 includes hydraulic components that facilitate fluid flow and electrical components that can be controlled by commands in the form of signals and/or data to allow operation of the actuation system 122 by an external controller. In the illustrated example, the actuation system 122 receives commands from a suspension system controller 124 over an electrical connection, for example, a data network that complies with the Controller Area Network standard.

The suspension system controller 124 is operable to control operation of the actuation system 122 and other active suspension components. The suspension system controller 124 can include a memory and a processor that is operable to execute instructions that are stored in the memory in order to perform suspension control operations. The suspension system controller 124 determines and outputs commands that are transmitted to the actuation system 122. The commands, when executed by the suspension system controller 124, modify one or more operating characteristics of the actuation system 122. The suspension system controller 124 can receive information from sensors, such as sensors associated with the hydraulic actuator 106, and determine the commands based on the information received from the sensors.

Figure 2:
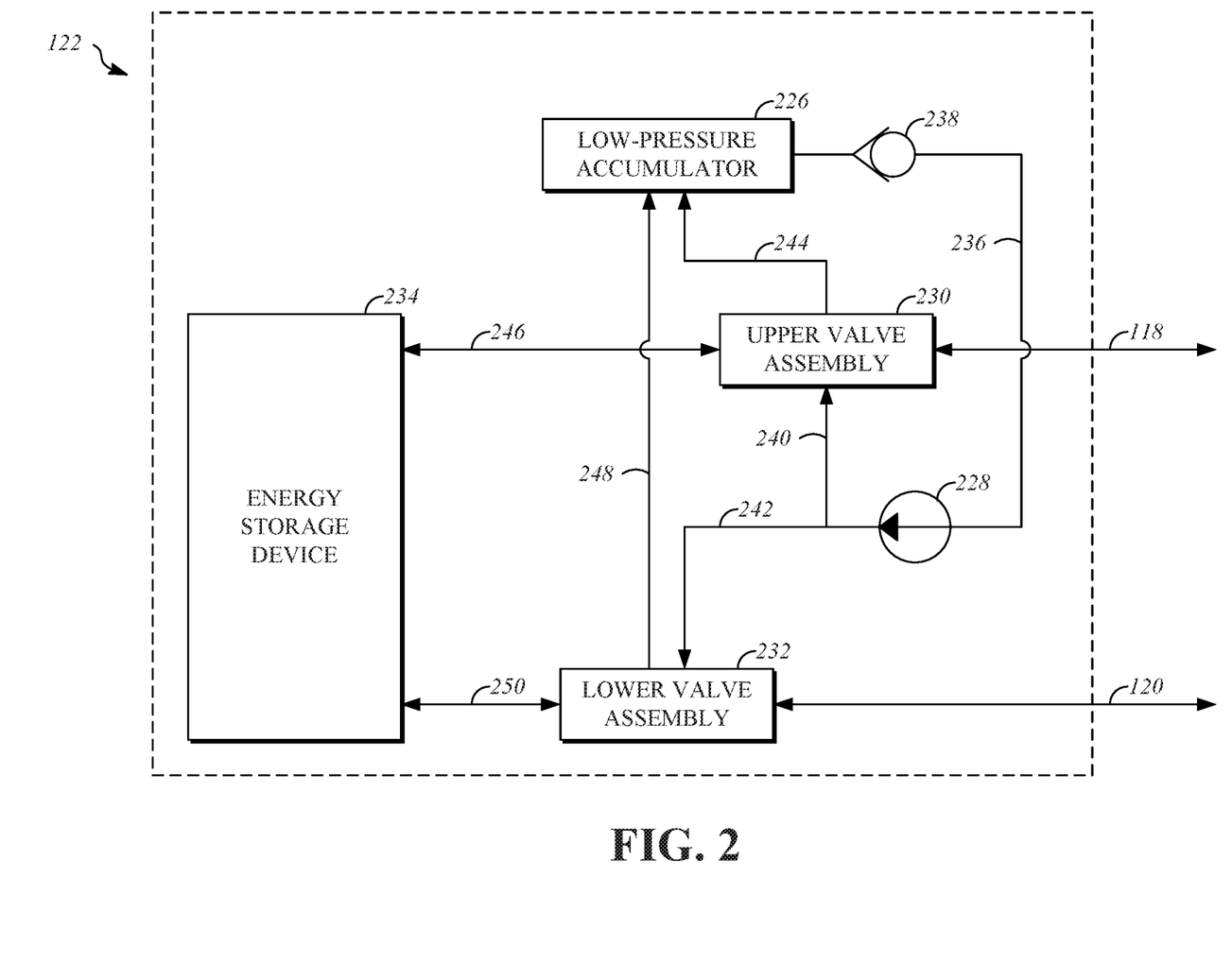
FIG. 2 is a block diagram that shows the actuation system.

FIG. 2 is block diagram that shows the actuation system 122. The actuation system 122 includes a low-pressure accumulator 226, a pump 228, an upper valve assembly 230, a lower valve assembly 232, and an energy storage device 234.

The low-pressure accumulator 226 serves as a reservoir for excess quantities of a working fluid that is used by the hydraulic actuator 106. The working fluid is a hydraulic fluid, such as an oil (or other liquid), and is incompressible.

The low-pressure accumulator 226 is connected to the pump 228 by a pump supply line 236. The pump supply line 236 allows transmission of the working fluid from the low-pressure accumulator 226 to the pump 228. A one-way flow valve 238 can be included along the pump supply line 236 so that fluid flows only from the low-pressure accumulator 226 to the pump 228, and backflow from the pump 228 to the low-pressure accumulator 226 is prevented.

The pump 228 provides the working fluid to the upper valve assembly 230 and the lower valve assembly 232. The pump 228 is connected to the upper valve assembly 230 by an upper valve supply line 240. The pump 228 is connected to the lower valve assembly 232 by a lower valve supply line 242.

The upper valve assembly 230 is connected to multiple components of the actuation system 122, and regulates flow of the working fluid to and from these components by controlling the states of multiple valves, which will be discussed further herein. The upper valve assembly 230 is connected to the upper hydraulic feed line 118 to allow the upper valve assembly 230 to supply the working fluid to the upper volume 114 of the hydraulic actuator 106 and to receive the working fluid from the upper volume 114 of the hydraulic actuator 106. The upper valve assembly 230 is connected to the low-pressure accumulator 226 by an upper return line 244 to return an excess volume of the working fluid from the upper valve assembly 230 to the low-pressure accumulator 226. The upper valve assembly 230 is connected to the energy storage device 234 by an upper energy storage line 246 to supply the working fluid to the energy storage device 234 and to receive the working fluid from the energy storage device 234.

The lower valve assembly 232 is connected to multiple components of the actuation system 122, and regulates flow of the working fluid to and from these components by controlling the states of multiple valves, which will be discussed further herein. The lower valve assembly 232 is connected to the hydraulic feed line 120 to allow the lower valve assembly 232 to supply the working fluid to the lower volume 116 of the hydraulic actuator 106 and to receive the working fluid from the lower volume 116 of the hydraulic actuator 106. The lower valve assembly 232 is connected to the low-pressure accumulator 226 by a lower return line 248 to return an excess volume of the working fluid from the lower valve assembly 232 to the low-pressure accumulator 226. The lower valve assembly 232 is connected to the energy storage device 234 by a lower energy storage line 250 to supply the working fluid to the energy storage device 234 and to receive the working fluid from the energy storage device 234.

As will be explained further herein, the energy storage device 234 includes a compressible medium that is compressed elastically by flow of the working fluid to the energy storage device 234 through the upper energy storage line 246 and the lower energy storage line 250. The flow of the working fluid to the energy storage device 234 can result from the external forces F_ext that are applied to the hydraulic actuator 106. The pressures generated by the external forces F_ext are sufficient to allow the working fluid to flow into the energy storage device 234 from the hydraulic actuator 106 and compress the compressible medium without additional pumping. Conversely, the pressures generated by compressing the compressible medium are sufficient to allow the working fluid to flow into the hydraulic actuator 106 from the energy storage device 234 and cause motion of the piston rod 110 without additional pumping. By controlling the upper valve assembly 230 and the lower valve assembly 232, this energy can be retained in the energy storage device 234 and subsequently released to assist operation of the hydraulic actuator 106. Use of the energy stored by the energy storage device 234 to operate the hydraulic actuator 106 can allow the actuation system 122 to respond more rapidly to changing magnitudes of the external forces F_ext, and can allow use of less energy by the pump 228, and/or can allow the pump 228 to be smaller in size than what would otherwise be required for the actuation system 122 if the energy storage device 234 was not present.

Figure 3A:
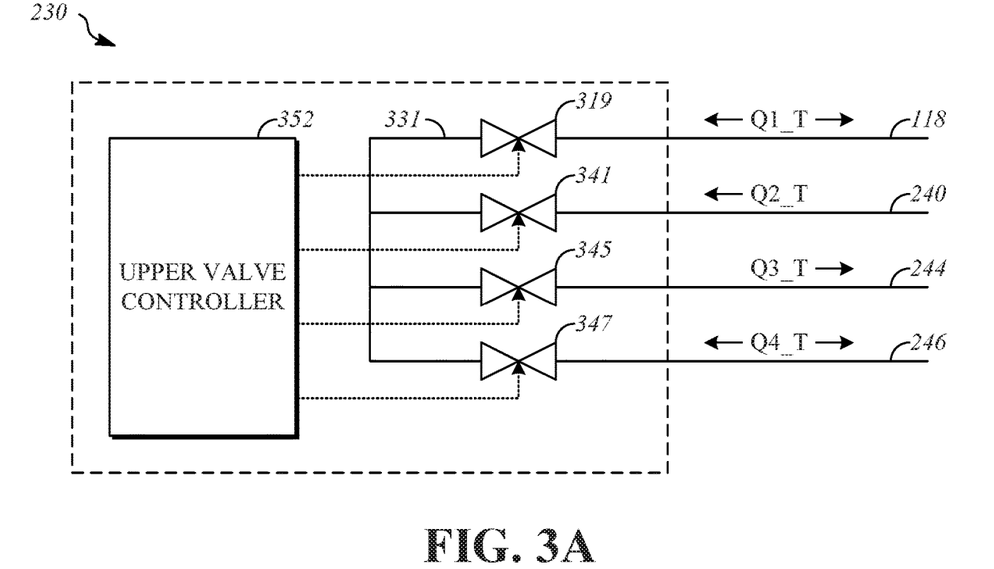
FIG. 3A is a diagram that shows an upper valve assembly of the actuation system.

FIG. 3A is a diagram that shows the upper valve assembly 230 of the actuation system 122. The upper valve assembly 230 includes an upper valve body 331, an upper feed valve 319, an upper supply valve 341, an upper return valve 345, and an upper storage valve 347. The upper valve body 331 interconnects the upper feed valve 319, the upper supply valve 341, the upper return valve 345, and the upper storage valve 347 such that when two of these valves are open simultaneously, fluid communication is established between them. An upper valve controller 352 can be incorporated in the upper valve assembly 230 and is electrically connected to actuate movement of each of the upper feed valve 319, the upper supply valve 341, the upper return valve 345, and the upper storage valve 347 between respective open and closed positions, or to control a respective degree of opening of each valve. The upper valve controller 352 is operated by commands that are received from the suspension system controller 124.

The upper feed valve 319 regulates a fluid flow Q1_T along the upper hydraulic feed line 118 with respect to the upper valve assembly 230. The fluid flow Q1_T is a two-directional flow that is operable to supply fluid to the upper volume 114 of the hydraulic actuator 106 from the upper valve assembly 230 along the upper hydraulic feed line 118, and receive fluid that is returned to the upper valve assembly 230 from the upper volume 114 of the hydraulic actuator 106 along the upper hydraulic feed line 118.

The upper supply valve 341 regulates a fluid flow Q2_T along the upper valve supply line 240 with respect to the upper valve assembly 230. The fluid flow Q2_T is a one-directional flow that is operable to supply fluid to the upper valve assembly 230 from the pump 228 along the upper valve supply line 240.

The upper return valve 345 regulates a fluid flow Q3_T along the upper return line 244 with respect to the upper valve assembly 230. The fluid flow Q3_T is a one-directional flow that is operable to return fluid to the low-pressure accumulator 226 from the upper valve assembly 230 along the upper return line 244.

The upper storage valve 347 regulates a fluid flow Q4_T along the upper energy storage line 246 with respect to the upper valve assembly 230. The fluid flow Q4_T is a two-directional flow that is operable to supply fluid to the energy storage device 234 from the upper valve assembly 230 along the upper energy storage line 246 and receive fluid that is returned to the upper valve assembly 230 from the energy storage device 234 to the upper valve assembly 230 along the upper energy storage line 246.

The upper valve assembly 230 allows control of fluid flow between the upper volume 114 of the hydraulic actuator 106 and the energy storage device 234. For example, the suspension system controller 124 can transmit a command to the upper valve controller 352 that causes the upper feed valve 319 and the upper storage valve 347 to move to open positions, which allows flow between the upper volume 114 of the hydraulic actuator 106 and the energy storage device 234 through the upper valve assembly 230, the upper feed valve 319, and the upper storage valve 347 directly, without use of the low-pressure accumulator 226 or the pump 228.

Figure 3B:
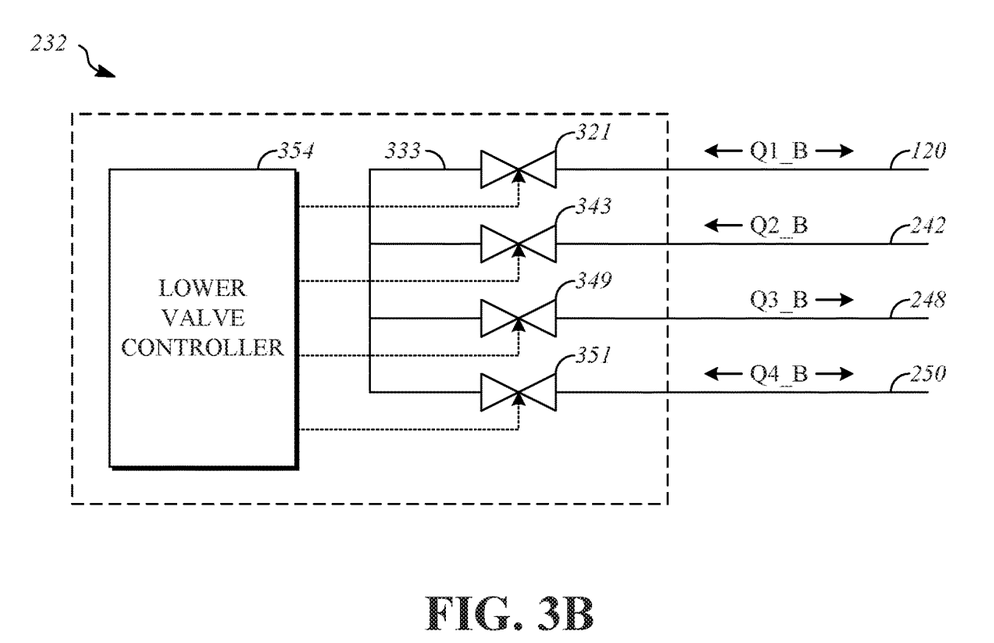
FIG. 3B is a diagram that shows a lower valve assembly of the actuation system.

FIG. 3B is a diagram that shows the lower valve assembly 232 of the actuation system 122. The lower valve assembly 232 includes a lower valve body 333, a lower feed valve 321, a lower supply valve 343, a lower return valve 349, and a lower storage valve 351. The lower valve body 333 interconnects the lower feed valve 321, the lower supply valve 343, the lower return valve 349, and the lower storage valve 351 such that when two of these valves are open simultaneously, fluid communication is established between them. A lower valve controller 354 can be incorporated in the lower valve assembly 232 and is electrically connected to actuate movement of each of the lower feed valve 321, the lower supply valve 343, the lower return valve 349, and the lower storage valve 351 between respective open and closed positions, or to control a respective degree of opening of each valve. The lower valve controller 354 is operated by commands that are received from the suspension system controller 124.

The lower feed valve 321 regulates a fluid flow Q1_B along the lower hydraulic feed line 120 with respect to the lower valve assembly 232. The fluid flow Q1_B is a two-directional flow that is operable to supply fluid to the lower volume 116 of the hydraulic actuator 106 from the lower valve assembly 232 along the lower hydraulic feed line 120, and receive fluid that is returned to the lower valve assembly 232 from the lower volume 116 of the hydraulic actuator 106 along the lower hydraulic feed line 120.

The lower supply valve 343 regulates a fluid flow Q2_B along the lower valve supply line 242 with respect to the lower valve assembly 232. The fluid flow Q2_B is a one-directional flow that is operable to supply fluid to the lower valve assembly 232 from the pump 228 along the lower valve supply line 242.

The return valve 349 regulates a fluid flow Q3_B along the return line 248 with respect to the lower valve assembly 232. The fluid flow Q3_B is a one-directional flow that is operable to return fluid to the low-pressure accumulator 226 from the lower valve assembly 232 along the return line 248.

The lower storage valve 351 regulates a fluid flow Q4_B along the lower energy storage line 250 with respect to the lower valve assembly 232. The fluid flow Q4_B is a two-directional flow that is operable to supply fluid to the energy storage device 234 from the lower valve assembly 232 along the lower energy storage line 250 and receive fluid that is returned to the lower valve assembly 232 from the energy storage device 234 along the lower energy storage line 250.

The lower valve assembly 232 allows control of fluid flow between the lower volume 116 of the hydraulic actuator 106 and the energy storage device 234. For example, the suspension system controller 124 can transmit a command to the lower valve controller 354 that causes the lower feed valve 321 and the lower storage valve 351 to move to open positions, which allows flow between the lower volume 116 of the hydraulic actuator 106 and the energy storage device 234 through the lower valve assembly 232, the upper feed valve 319, and the upper storage valve 347 directly, without use of the low-pressure accumulator 226 or the pump 228.

In one implementation, the working fluid can be a magnetorheological (MR) hydraulic fluid. The MR hydraulic fluid can be, for example, an oil with ferromagnetic particles suspended in the oil. The MR hydraulic fluid reacts to magnetic fields by changing viscosity, as a result of the ferromagnetic particles moving from a first state in which the ferromagnetic particles are distributed randomly in the oil absent a significant magnetic field, to a second state in which the ferromagnetic particles form chains along the flux lines of the magnetic field.

To control flow of the MR hydraulic fluid, the valves that are incorporated in the upper valve assembly 230 and the lower valve assembly 232 are electromagnetic coils in implementations that utilize the MR hydraulic fluid. When the coils are fully energized, flow of the MR hydraulic fluid stops. When the coils are fully deenergized, the MR hydraulic fluid flows normally. The current applied to the coils can be controlled between fully energized and fully deenergized states to control flow of the MR hydraulic fluid, and this type of control can be utilized to apply damping to the hydraulic actuator 106.

Figure 4:
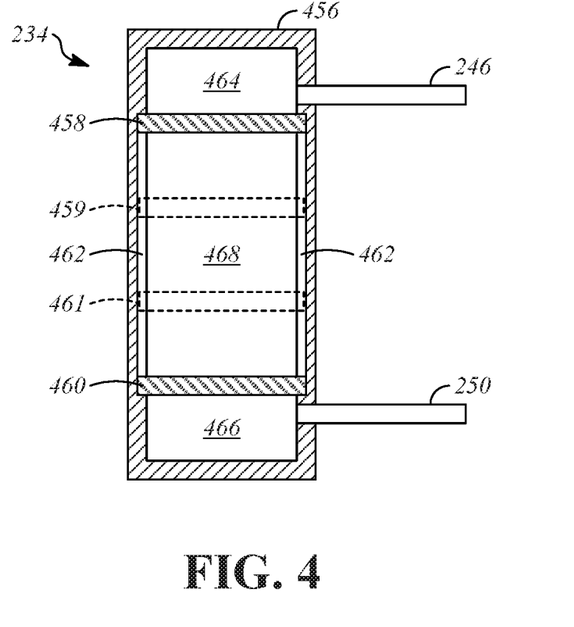
FIG. 4 is a diagram that shows an energy storage device of the actuation system according to a first example.

FIG. 4 is a diagram that shows the energy storage device 234 of the actuation system 122. The energy storage device 234 includes a cylindrical housing 456 that is connected to the upper energy storage line 246 and the lower energy storage line 250. An upper piston head 458 and a lower piston head 460 are disposed inside the cylindrical housing 456. The upper piston head 458 and the lower piston head 460 are rigid structures that can move longitudinally within the cylindrical housing 456. To guide motion of the upper piston head 458 and the lower piston head 460, guide structures 462 can be formed inside the cylindrical housing 456 to engage and constrain motion of the upper piston head 458 and the lower piston head 460. The guide structures 462 can be, for example, longitudinally extending tracks or grooves that are engaged by corresponding projections that are formed on the upper piston head 458 and the lower piston head 460.

The upper piston head 458 and the lower piston head 460 divide the interior of the cylindrical housing 456 into several spaces that are substantially sealed against fluid flow between them. In the illustrated example, the cylindrical housing 456 is divided into three spaces including an upper chamber 464, a lower chamber 466, and a compressible chamber 468.

The upper chamber 464 is located adjacent to the upper piston head 458 and may, for example, be located between the upper piston head 458 and an end portion of the cylindrical housing 456. The upper chamber 464 is in fluid communication with the upper energy storage line 246 such that the working fluid flows into and out of the upper chamber 464 through the upper energy storage line 246. The volume of the upper chamber 464 is dependent upon the position of the upper piston head 458. In some implementations, the upper piston head 458 can be the only movable structure that forms part of the extents of the upper chamber 464, with the remainder of the upper chamber 464 being bounded by the cylindrical housing 456 or other fixed/incompressible structures. The upper piston head 458 is shown in an uncompressed position, resulting in a minimum volume for the upper chamber 464. An example of a compressed position 459 of the upper piston head 458 is illustrated in broken lines. The compressed position 459 of the upper piston head 458 is defined when the working fluid flows into the upper chamber 464 and applies force to the upper piston head 458 to move it toward the compressed position 459. When the upper piston head 458 is in the compressed position 459, a maximum volume can be defined for the upper chamber 464.

The lower chamber 466 is located adjacent to the lower piston head 460 and may, for example, be located between the lower piston head 460 and an end portion of the cylindrical housing 456. The lower chamber 466 is in fluid communication with the lower energy storage line 250 such that the working fluid flows into and out of the lower chamber 466 through the lower energy storage line 250. The volume of the lower chamber 466 is dependent upon the position of the lower piston head 460. In some implementations, the lower piston head 460 can be the only movable structure that forms part of the extents of the lower chamber 466, with the remainder of the lower chamber 466 being bounded by the cylindrical housing 456 or other fixed/incompressible structures. The lower piston head 460 is shown in an uncompressed position, resulting in a minimum volume for the lower chamber 466. An example of a compressed position 461 of the lower piston head 460 is illustrated in broken lines. The compressed position 461 of the lower piston head 460 is defined when the working fluid flows into the lower chamber 466 and applies force to the lower piston head 460 to move it toward the compressed position 461. When the lower piston head 460 is in the compressed position 461, a maximum volume can be defined for the lower chamber 466.

The compressible chamber 468 is defined between the upper piston head 458 and the lower piston head 460. The volume of the compressible chamber 468 is dependent upon the position of the upper piston head 458 and the position of the lower piston head 460.

The compressible chamber 468 stores energy by allowing the working fluid that is present in the upper chamber 464 and the lower chamber 466 to compress a compressible medium that is present inside the compressible chamber 468. As one example, the compressible medium is a compressible gas, such as air. The compressible medium is elastic, such that the compressible medium returns to its original state when the force applied by the working fluid is removed.

When the upper piston head 458 and/or the lower piston head 460 move toward the compressed positions 459, 461, thereby compressing the compressible chamber 468, energy is stored in the compressible medium that is located in the compressible chamber 468 as a result of the working fluid being forced into the upper chamber 464 and/or the lower chamber 466. When the upper piston head 458 and/or the lower piston head 460 move toward the uncompressed positions, thereby expanding the compressible chamber 468, energy is removed from the compressible medium, and is utilized to force the working fluid out of the upper chamber 464 and/or the lower chamber 466.

Figure 5:
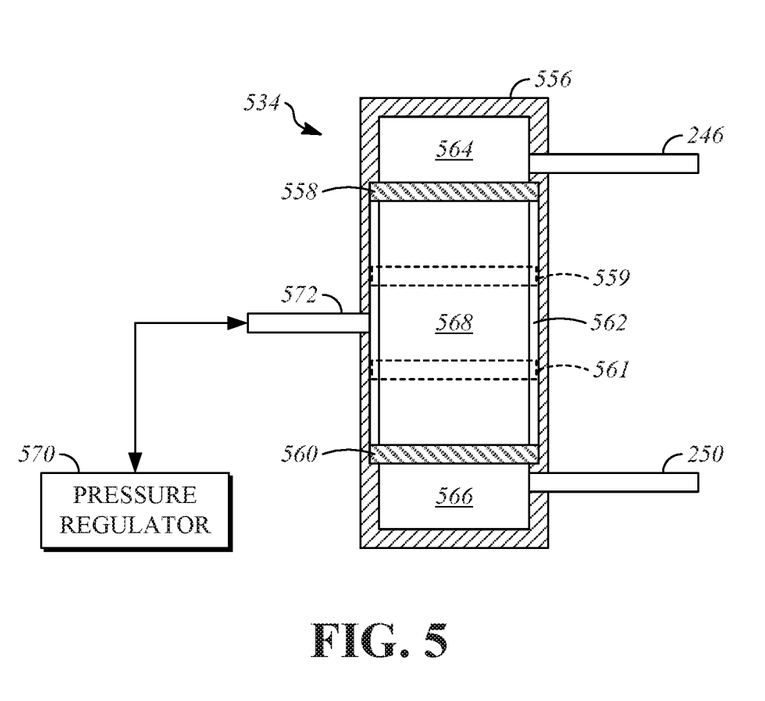
FIG. 5 is a diagram that shows an energy storage device of the actuation system according to a second example.

FIG. 5 is a diagram that shows an energy storage device 534 that can be utilized in the actuation system 122 in place of the energy storage device 234. The energy storage device 534 includes a cylindrical housing 556 that is connected to the upper energy storage line 246 and the lower energy storage line 250. An upper piston head 558 and a lower piston head 560 are disposed inside the cylindrical housing 556. The upper piston head 558 and the lower piston head 560 are rigid structures that can move longitudinally within the cylindrical housing 556. To guide motion of the upper piston head 558 and the lower piston head 560, guide structures 562 can be formed inside the cylindrical housing 556 to engage and constrain motion of the upper piston head 558 and the lower piston head 560. The upper piston head 558 and the lower piston head 560 divide the interior of the cylindrical housing 556 into several spaces that are substantially sealed against fluid flow between them. In the illustrated example, the cylindrical housing 556 is divided into three spaces including an upper chamber 564, a lower chamber 566, and a compressible chamber 568. These components of the energy storage device 534 are all as described with respect to similarly named components of the energy storage device 234.

The compressible chamber 568 stores energy by allowing the working fluid that is present in the upper chamber 564 and the lower chamber 566 to compress the volume displaced by the compressible chamber 568 within the cylindrical housing 556 and thereby compress a compressible medium that is present inside the compressible chamber 568. As one example, the compressible medium is a compressible gas, such as air.

When the upper piston head 558 and/or the lower piston head 560 move toward compressed positions 559, 561, thereby compressing the compressible chamber 568, energy is stored in the compressible medium that is located in the compressible chamber 568 as a result of the working fluid being forced into the upper chamber 564 and/or the lower chamber 566. When the upper piston head 558 and/or the lower piston head 560 move toward the uncompressed positions, thereby expanding the compressible chamber 568, energy is removed from the compressible medium, and is utilized to force the working fluid out of the upper chamber 564 and/or the lower chamber 566.

In order to vary the amount of energy stored in the compressible medium, the energy storage device 534 incorporates a pressure regulator 570. The pressure regulator 570 is operable to increase and decrease a gas pressure within the compressible chamber 568.

The pressure regulator 570 is connected to the energy storage device 534 by a pressure regulation line 572 and is in fluid communication with the compressible chamber 568 through the pressure regulation line 572. The pressure regulator 570 can include a supply of high pressure gas, such as from a compressor, and can be operable to remove gas from the compressible chamber 568, such by venting using a venting valve. The pressure regulator 570 can be an electromechanical system that receives commands from the suspension system controller 124, wherein the commands cause the pressure regulator 570 to supply and/or remove gas from the compressible chamber 568 of the energy storage device 534.

The pressure regulator 570 can increase the pressure within the compressible chamber 568 by supplying pressurized gas to the compressible chamber 568 through the pressure regulation line 572. During supply of pressurized gas to the compressible chamber 568, the upper piston head 558 and the lower piston head 560 can remain fixed in place, by holding the amount of working fluid within the energy storage device 534 constant using the upper valve assembly 230 and the lower valve assembly 232. By increasing the pressure within the compressible chamber 568, the pressure regulator 570 adds energy to the energy storage device 534. The pressure regulator 570 can decrease the pressure within the compressible chamber 568, such as by venting or pumping gas from the compressible chamber 568 to atmosphere or to a tank. During removal of gas from the compressible chamber 568, the upper piston head 558 and the lower piston head 560 can remain fixed in place, by holding the amount of working fluid within the energy storage device 534 constant using the upper valve assembly 230 and the lower valve assembly 232. By decreasing the pressure within the compressible chamber 568, the pressure regulator 570 removes energy from the energy storage device 534.

Figure 6:
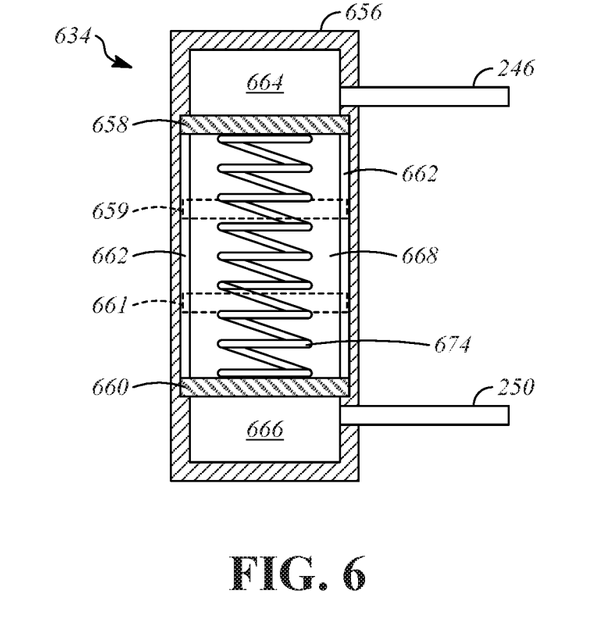
FIG. 6 is a diagram that shows an energy storage device of the actuation system according to a third example.

FIG. 6 is a diagram that shows an energy storage device 634 that can be utilized in the actuation system 122 in place of the energy storage device 234. The energy storage device 634 includes a cylindrical housing 656 that is connected to the upper energy storage line 246 and the lower energy storage line 250. An upper piston head 658 and a lower piston head 660 are disposed inside the cylindrical housing 656. The upper piston head 658 and the lower piston head 660 are rigid structures that can move longitudinally within the cylindrical housing 656. To guide motion of the upper piston head 658 and the lower piston head 660, guide structures 662 can be formed inside the cylindrical housing 656 to engage and constrain motion of the upper piston head 658 and the lower piston head 660. The upper piston head 658 and the lower piston head 660 divide the interior of the cylindrical housing 656 into several spaces that are substantially sealed against fluid flow between them. In the illustrated example, the cylindrical housing 656 is divided into three spaces including an upper chamber 664, a lower chamber 666, and a compressible chamber 668. These components of the energy storage device 634 are all as described with respect to similarly named components of the energy storage device 234.

The compressible chamber 668 stores energy by allowing the working fluid that is present in the upper chamber 664 and the lower chamber 666 to compress the volume displaced by the compressible chamber 668 within the cylindrical housing 656 in opposition to a force exerted upon the upper piston head 658 and the lower piston head 660 by an elastic structure that is located inside the compressible chamber 668 and is in engagement with the upper piston head 658 and the lower piston head 660. In the illustrated example, the elastic structure includes a compression spring 674. In alternative implementations, the elastic structure includes multiple springs, includes structures that behave like springs, or include other elastic structures that are able to resist compression in response to application of an external force and subsequently return to their original states when the external force is removed.

When the upper piston head 658 and/or the lower piston head 660 move toward compressed positions 659, 661, thereby compressing the compressible chamber 668, energy is stored in the compression spring 674 as the length of the compression spring 674 decreases as a result of the working fluid being forced into the upper chamber 664 and/or the lower chamber 666. When the upper piston head 658 and/or the lower piston head 660 move toward the uncompressed positions in response to the force applied to them by the compression spring 674, thereby expanding the compressible chamber 668, energy is removed from the compressible medium, and is utilized to force the working fluid out of the upper chamber 664 and/or the lower chamber 666.

Figure 7:
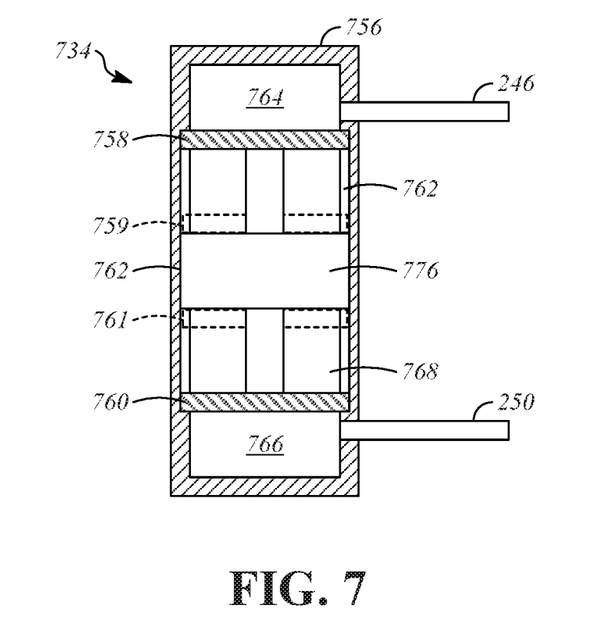
FIG. 7 is a diagram that shows an energy storage device of the actuation system according to a fourth example.

FIG. 7 is a diagram that shows an energy storage device 734 that can be utilized in the actuation system 122 in place of the energy storage device 234. The energy storage device 734 includes a cylindrical housing 756 that is connected to the upper energy storage line 246 and the lower energy storage line 250. An upper piston head 758 and a lower piston head 760 are disposed inside the cylindrical housing 756. The upper piston head 758 and the lower piston head 760 are rigid structures that can move longitudinally within the cylindrical housing 756. To guide motion of the upper piston head 758 and the lower piston head 760, guide structures 762 can be formed inside the cylindrical housing 756 to engage and constrain motion of the upper piston head 758 and the lower piston head 760. The upper piston head 758 and the lower piston head 760 divide the interior of the cylindrical housing 756 into several spaces that are substantially sealed against fluid flow between them. In the illustrated example, the cylindrical housing 756 is divided into three spaces including an upper chamber 764, a lower chamber 766, and a compressible chamber 768. These components of the energy storage device 734 are all as described with respect to similarly named components of the energy storage device 234.

The compressible chamber 768 stores energy by allowing the working fluid that is present in the upper chamber 764 and the lower chamber 766 to compress the volume displaced by the compressible chamber 768 within the cylindrical housing 756 in opposition to a force exerted upon the upper piston head 758 and the lower piston head 760 by an energy storage actuator 776 that is located inside the compressible chamber 768 and is connected to and/or in engagement with the upper piston head 758 and the lower piston head 760. The force exerted by the energy storage actuator 776 is controlled the by the suspension system controller 124. As one example, the energy storage actuator 776 can be an electric motor and can also include a gear train or linkage that connects the electric motor to the upper piston head 758 and the lower piston head 760. As another example, the energy storage actuator 776 can be a hydraulic actuator that is connected to the upper piston head 758 and the lower piston head 760 by piston rods. As another example, the energy storage actuator 776 can be an electromagnetic actuator that generates a magnetic field that attracts or repels the upper piston head 758 and the lower piston head 760.

When the upper piston head 758 and/or the lower piston head 760 move toward compressed positions 759, 761, thereby compressing the compressible chamber 768, energy is stored in the energy storage device 734 as a function of the volume of the working fluid that is present within the upper chamber 764 and the lower chamber 766 and available to be forced out of the energy storage device 734 by movement of the upper piston head 758 and the lower piston head 760 toward the uncompressed positions, thereby expanding the compressible chamber 768.

The energy storage device 234, the energy storage device 534, the energy storage device 634, and the energy storage device 734 can be utilized in combination with one another for the purpose of storing energy using a compressible chamber. As an example, the compressible gas discussed in connection with the energy storage device 234 can be utilized in combination with the compression spring 674 of the energy storage device 634.

Figure 8:
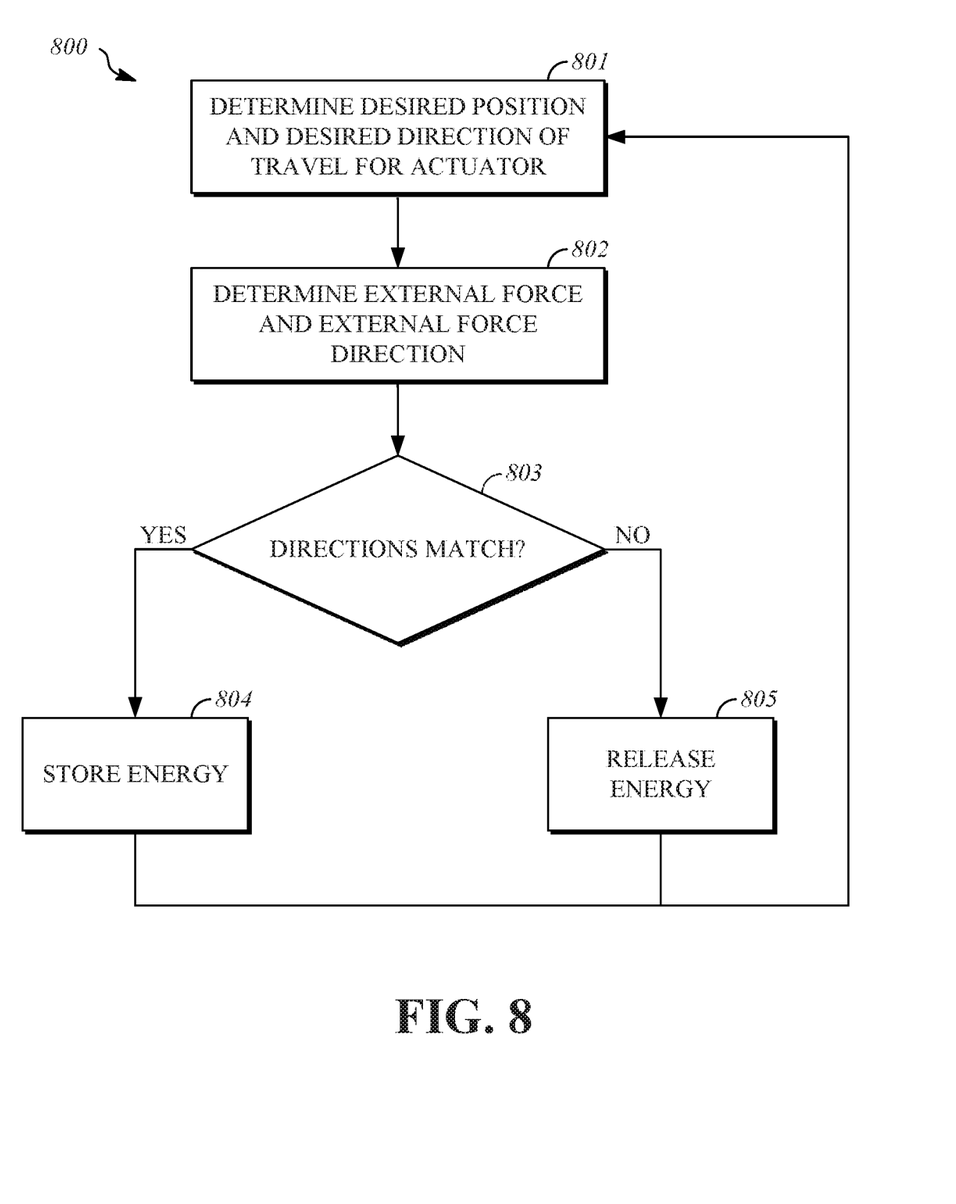
FIG. 8 is a flowchart that shows an example of a control process for an active suspension system with an energy storage device.

FIG. 8 is a flowchart that shows an example of a process 800 for controlling an active suspension system with an energy storage device. The process 800 may be implemented using the hydraulic actuator 106, the actuation system 122, and may be implemented in part by software executed by some or all of the components of the vehicle 100, such as the suspension system controller 124. Although the process 800 is described in the context of active suspension control, it should be understood that the process 800 is applicable to actuator control generally.

Operation 801 includes determining a desired position and a desired direction of travel for an actuator. As an example, operation 801 can include determining a desired position for the piston rod 110 of the hydraulic actuator 106 relative to the cylinder body 108. The desired position for the piston rod 110 is determined, for example, by the suspension system controller 124, in order to achieve certain handling or ride quality characteristics. The desired direction of travel is determined based on a current position of the piston rod 110 of the hydraulic actuator 106. The current position of the piston rod 110 may be determined, for example, by sensors that are incorporated in the hydraulic actuator 106 and provide output signals to the suspension system controller 124. Such a sensor could be, for example, a linear variable differential transformer (LVDT). The desired direction of travel is then determined by comparison of the current position of the piston rod 110 and the desired position of the piston rod 110. As an example, a first direction of travel can correspond to retraction of the piston rod 110 into the cylinder body 108, and a second direction of travel can correspond to extension of the piston rod 110 from the cylinder body 108.

Operation 802 includes determining an external force, such as F_ext, and an external force direction. The external force that is acting upon the piston rod 110 of the hydraulic actuator 106 can be measured by a sensor. As one example, the external force can be measured by a force sensor, such as a hydraulic force transducer. As another example, the external force can be determined based on motion of the piston rod 110, as measured with a position sensor as previously described. The magnitude of the external force has a magnitude that corresponds to the direction of the external force. The direction of the external force may correspond to the first direction of travel of the piston rod 110 or the second direction of travel of the piston rod 110.

In operation 803, a determination is made as to whether to permit or resist motion of the piston rod 110 in response to the external force. This determination is made by comparing the desired direction of travel and the external force direction. If the desired direction of travel of the piston rod 110 matches the external force direction, the process proceeds to operation 804. If the desired direction of travel of the piston rod 110 is opposite the external force direction, the process proceeds to operation 805.

Operation 804 and operation 805 are performed using an energy storage device, such as the energy storage device 234, the energy storage device 534, the energy storage device 634, or the energy storage device 734, and will be explained with reference to the energy storage device 234. In some implementations, use of the energy storage device 234 to store or release energy in operation 804 and operation 805 is only performed when additional criteria are satisfied. These criteria may be related to, as examples, the magnitude of the external force, the velocity of the piston rod 110, and fluid pressures at one location or multiple locations in the hydraulic actuator 106 and/or the actuation system 122.

In operation 804, it has been determined that the direction of the external force is acting in the same direction as the desired direction of travel of the piston rod 110. In response, the suspension system controller 124 operates at least one of the upper valve assembly 230 or the lower valve assembly 232 to permit motion of the piston rod 110 by allowing fluid to flow from the hydraulic actuator 106 to the energy storage device 234, thereby compressing the compressible chamber 468 of the energy storage device 234.

In operation 804, since the actuation system 122 is able to allow the piston rod 110 to change position in correspondence with application of the external force, excess energy may be present in the actuation system 122, and this energy can be stored by compressing the compressible medium or elastic structure in an energy storage device, such as the energy storage device 234. To do so, fluid communication is established between the hydraulic actuator 106 and the energy storage device 234, for example, such as by operation of valves as described in connection with the upper valve assembly 230 and the valve assembly 232. Fluid is allowed to flow into the energy storage device 234. Energy storage can continue, for example, until there is no longer enough excess energy in the actuation system 122 to compress the compressible medium of the energy storage device 234, or until the direction of the external force is no longer acting in the same direction as the desired direction of travel of the piston rod 110. When energy storage is completed, fluid communication between the hydraulic actuator 106 and the energy storage device 234 is blocked, such as by operation of valves as described in connection with the upper valve assembly 230 and the lower valve assembly 232.

During operation 804, damping can be applied to the motion of the piston rod 110, such as by controlling the rate at which the working fluid is permitted to flow to the energy storage device 234.

In operation 805, it has been determined that the direction of the external force is acting opposite the desired direction of travel of the piston rod 110. In response, the suspension system controller 124 operates at least one of the upper valve assembly 230 or the lower valve assembly 232 to resist motion of the piston rod 110 by allowing fluid to flow from the energy storage device 234 to the hydraulic actuator 106, thereby expanding the compressible chamber 468 of the energy storage device 234.

In operation 805, to achieve motion of the piston rod 110 in the desired direction of travel, the actuation system 122 applies a force in opposition to the external force. To supplement fluid pressure that is otherwise available in the actuation system 122, such as from the pump 228, additional energy can be added to the actuation system 122. This additional energy can be released by expansion of the compressible medium or elastic structure in an energy storage device, such as the energy storage device 234. To do so, fluid communication is established between the hydraulic actuator 106 and the energy storage device 234, such as by operation of valves as described in connection with the upper valve assembly 230 and the valve assembly 232. Fluid is allowed to flow from the energy storage device 234 to the hydraulic actuator 106. Energy release can continue, for example, until there is no longer enough excess energy in the energy storage device 234 to cause movement of the piston rod 110, or until the direction of the external force is no longer acting in opposition to the desired direction of travel of the piston rod 110. When energy storage is completed, fluid communication between the hydraulic actuator 106 and the energy storage device 234 is blocked, such as by operation of valves as described in connection with the upper valve assembly 230 and the lower valve assembly 232.

Subsequent to operation 804 or 805, the process 800 can return to operation 801.

What is claimed is:

1. An active suspension system for a vehicle having a wheel that is subject to an external force, comprising:
an actuator having an output structure that is connected to the wheel such that the external force acts on the output structure;
an energy storage device having a compressible chamber;
a valve assembly that is positioned in fluid communication between the actuator and the energy storage device and is operable to control flow of a working fluid between the actuator and the energy storage device; and
a controller that makes a determination to permit motion of the output structure in response to the external force or to resist motion of the output structure in response to the external force, and controls the valve assembly according to the determination.

2. The active suspension system of claim 1, wherein:
the controller permits motion of the output structure when a desired travel direction for the output structure matches an external force direction, and the controller resists motion of the output structure when a desired travel direction for the output structure is opposite the external force direction,
the controller permits motion of the output structure by controlling the valve assembly to allow fluid to flow from the actuator to the energy storage device using the valve assembly, thereby compressing the compressible chamber, and
the controller resists motion of the output structure by controlling the valve assembly to allow fluid to flow from the energy storage device to the actuator using the valve assembly, thereby expanding the compressible chamber.

3. The active suspension system of claim 1, wherein a compressible medium is disposed in the compressible chamber.

4. The active suspension system of claim 3, wherein the compressible medium is a gas.

5. The active suspension system of claim 4, further comprising:
a pressure regulator for increasing and decreasing a gas pressure within the compressible chamber.

6. The system of claim 1, wherein an elastic structure is disposed within the compressible chamber.

7. The system of claim 1, wherein an energy storage actuator is disposed within the compressible chamber.

8. The system of claim 1, wherein the working fluid is a magnetorheological hydraulic fluid and the valve assembly includes electromagnetic coils.

9. The system of claim 1, further comprising:
a low-pressure reservoir that stores a portion of the working fluid; and
a pump that is connected to the low-pressure reservoir to supply the working fluid from the low-pressure reservoir to the valve assembly.

10. The system of claim 1, wherein the energy storage device is connected to the valve assembly by a two-directional flow line.

11. A system, comprising:
a hydraulic actuator having a body, a piston rod that extends out of the body, a piston head disposed in the body, a first volume defined inside the body on a first side of the piston head, and a second volume defined inside the body on a second side of the piston head;
an energy storage device having a housing, a first chamber defined inside the housing, a second chamber defined inside the housing, and a compressible chamber defined inside the housing;
a first valve assembly that is operable to control flow of a working fluid between the first volume of the hydraulic actuator and the first chamber of the energy storage device;
a second valve assembly that is operable to control flow of the working fluid between the second volume of the hydraulic actuator and the second chamber of the energy storage device; and
a controller that controls operation of at least one of the first valve assembly or the second valve assembly to store energy in the energy storage device by compressing the compressible chamber by flow of the working fluid into the energy storage device from the hydraulic actuator when a desired travel direction for the piston rod matches an external force direction, and controls operation of at least one of the first valve assembly or the second valve assembly to release energy from the energy storage device by expanding the compressible chamber by flow of the working fluid into the hydraulic actuator from the energy storage device when the desired travel direction for the piston rod is opposite the external force direction.

12. The system of claim 11, wherein the energy storage device is configured such that the compressible chamber is located between the first chamber and the second chamber.

13. The system of claim 12, wherein flow of the working fluid into the first chamber is operable to compress the compressible chamber and flow of the working fluid into the second chamber is operable to compress the compressible chamber.

14. The system of claim 11, wherein a compressible gas is located in the compressible chamber.

15. The system of claim 14, further comprising:
a pressure regulator that is operable to increase and decrease an amount of the compressible gas that is located in the compressible chamber.

16. The system of claim 11, wherein a compression spring is located in the compressible chamber.

17. The system of claim 11, wherein the first valve assembly is connected to the first chamber of the energy storage device by a first two-directional flow line and the second valve assembly is connected to the second chamber of the energy storage device by a second two-directional flow line.

18. A method, comprising:
determining a desired direction of travel for an actuator;
determining an external force direction of an external force that is applied to the actuator;
determining whether the external force direction matches the desired direction of travel for the actuator;
in response to determining that the external force direction matches the desired direction of travel for the actuator, controlling a valve assembly to cause storage of energy from the actuator in an energy storage device by compressing a compressible chamber of the energy storage device by flow of a working fluid into the energy storage device from the actuator, wherein the valve assembly is positioned in fluid communication between the actuator and the energy storage device and is configured to control flow of the working fluid between the actuator and the energy storage device along a two-directional flow line; and
in response to determining that the external force direction does not match the desired direction of travel for the actuator, controlling the valve assembly to cause release of energy from the energy storage device to the actuator by expanding a compressible chamber of the energy storage device by flow of the working fluid from the energy storage device to the actuator.

19. The method of claim 18, wherein the valve assembly is configured to establish flow of the working fluid between the actuator and the energy storage device along the two-directional flow line and to block flow of the working fluid between the actuator and the energy storage device along the two-directional flow line.

20. The method of claim 18, wherein a compressible medium is located in the compressible chamber.

* * * * *